United States Patent
Falkiewicz et al.

(10) Patent No.: US 7,678,467 B2
(45) Date of Patent: Mar. 16, 2010

(54) ASPHALT SHINGLE COATING WITH IMPROVED TEAR STRENGTH

(75) Inventors: Michael Falkiewicz, Churchville, PA (US); Rene Maldonado, Brentwood, MO (US)

(73) Assignee: ICL Performance Products LP, St. Louis, MO (US)

( * ) Notice: Subject to any disclaimer, the term of this patent is extended or adjusted under 35 U.S.C. 154(b) by 162 days.

(21) Appl. No.: 11/562,819

(22) Filed: Nov. 22, 2006

(65) Prior Publication Data

US 2008/0119591 A1    May 22, 2008

(51) Int. Cl.
*C08L 95/00*    (2006.01)

(52) U.S. Cl. .................. 428/489; 524/59; 524/68; 524/70; 524/71; 106/273.1; 106/281.1; 428/141

(58) Field of Classification Search ........... 106/273.1, 106/281.1; 524/59, 68, 70, 71; 428/141, 428/489
See application file for complete search history.

(56) References Cited

U.S. PATENT DOCUMENTS

| | | | |
|---|---|---|---|
| 1,911,114 A | | 5/1933 | Gard et al. |
| 2,906,687 A | * | 9/1959 | Roediger et al. .............. 208/5 |
| 3,931,440 A | | 1/1976 | Shepherd et al. |
| 4,468,430 A | | 8/1984 | Ruede |
| 4,817,358 A | | 4/1989 | Lincoln et al. |
| 4,895,754 A | | 1/1990 | Graham et al. |
| 5,070,123 A | | 12/1991 | Moran |
| 5,095,055 A | | 3/1992 | Moran |
| 5,492,562 A | | 2/1996 | Pettinato |
| 5,880,185 A | * | 3/1999 | Planche et al. .............. 524/68 |
| 5,990,206 A | * | 11/1999 | Tanaka et al. .............. 524/59 |
| 6,136,898 A | | 10/2000 | Loza et al. |
| 6,228,909 B1 | | 5/2001 | Baumgardner et al. |
| 6,384,116 B1 | | 5/2002 | Chan et al. |
| 6,414,056 B1 | | 7/2002 | Puzic et al. |
| 6,531,200 B2 | | 3/2003 | Zickell et al. |
| 6,777,023 B2 | | 8/2004 | Rodenbaugh et al. |
| 6,852,779 B1 | * | 2/2005 | Planche et al. .............. 524/68 |
| 6,993,876 B1 | | 2/2006 | Peng et al. |
| 7,041,717 B2 | * | 5/2006 | Margulis .............. 524/69 |
| 7,238,230 B1 | * | 7/2007 | Moss et al. .............. 106/284.02 |
| 7,309,390 B2 | * | 12/2007 | Falkiewicz .............. 106/284.04 |
| 2002/0068776 A1 | * | 6/2002 | Guo et al. .............. 524/59 |
| 2003/0008094 A1 | * | 1/2003 | Zickell .............. 428/40.1 |
| 2007/0131578 A1 | * | 6/2007 | Ruan et al. .............. 208/6 |
| 2007/0287778 A1 | * | 12/2007 | Martin .............. 524/59 |

FOREIGN PATENT DOCUMENTS

| | | | |
|---|---|---|---|
| JP | 52-152923 | * | 12/1977 |
| JP | 52152923 | * | 12/1977 |
| JP | 2003-12931 | * | 1/2003 |

OTHER PUBLICATIONS

Akbari, H., et al., Review of Residential Roofing Materials, Part I, Western Roofing, pp. 54-57, Jan./Feb. 2005.
Akbari, H., et al., Review of Residential Roofing Materials, Part II, Western Roofing, pp. 52, 54-58, Mar./Apr. 2005.
Heller, K. B., et al., Economic Analysis for Air Pollution Regulations: Asphalt Roofing and Processing, U.S. Environmental Protective Agency, Office of Air Quality Planning and Standards, Research Triangle Park, NC 27709, Feb. 2003.
International Search Report of corresponding International Patent Application No. PCT/US2007/084159.

* cited by examiner

*Primary Examiner*—Peter Szekely
(74) *Attorney, Agent, or Firm*—Thompson Coburn LLP; Kevin M. Kercher, Esq.

(57) ABSTRACT

The present invention is directed to an air-blown roofing asphalt modified with polyphosphoric acid and roofing products made with the polyphosphoric acid-modified, air-blown asphalt.

19 Claims, 4 Drawing Sheets

US 7,678,467 B2

ASPHALT SHINGLE COATING WITH IMPROVED TEAR STRENGTH

BACKGROUND OF THE INVENTION

1. Field of the Invention

The present invention relates to asphalt roofing materials with additives that are believed to, among other things, enhance adhesion and/or tear strength of an asphalt coating material used to make the roofing materials, and more particularly wherein the additives include polyphosphoric acid.

2. Description of the Related Technology

As is well known, asphalt is commonly used to make roofing shingles. Typically, the asphalt is used to coat fiberglass mats and then the coated mats are covered with mineral or ceramic granules. This type of shingle is commonly referred to as "fiberglass shingles" and "asphalt shingles." Although not as prevalent, asphalt is also used to manufacture "organic shingles" in which a cellulose base is saturated in asphalt. Because of the saturation, organic shingles tend to be heavier than fiberglass shingles. Also, organic shingles tend to be less resistant to heat and humidity, but more durable in freezing conditions than fiberglass shingles.

With respect to fiberglass shingles, tear strength is an extremely important characteristic because of the development of fiberglass shingles over the years. Briefly, when fiberglass shingles were first manufactured the fiberglass mat weighed approximately 3.0 lbs/480 ft$^2$ and at that weight with asphalts at the time a minimum tear strength standard of 1,700 grams cross direction ("CD") was established by the industry. "Cross direction" means performing the tear test at an angle perpendicular to the direction the shingle flowed from the machine (i.e., the "machine direction" or "MD"). Over time, manufacturers, by focusing their research efforts on glass mat technology, have been able to reduce the weight of glass mats, which decreases their material costs. Specifically, the glass mats used widely today are within the range of about 1.5 to about 2.0 lbs/480 ft$^2$. While many fiberglass shingles using lighter weight mats can still satisfy the 1,700 gram tear strength standard, it has prevented the use of even lighter weight mats to produce otherwise acceptable asphalt shingles at still lower costs.

The 1,700 gram standard is a contentious issue between roofing product manufacturers and roofing product purchasers. With purchasers relying almost entirely on tear strength to determine whether fiberglass shingles are defective. The importance of tear strength is illustrated by the fact that litigations between producers and purchasers over the performance of shingles were based primarily on whether shingles satisfied this single property.

Although the manufacturers' efforts to improve the fiberglass mat technology have allowed some reduction in their material costs, those reductions have sometimes been at the expense of acceptable tear strengths. Thus, a need continues to exist for a technology, method, materials, or a combination thereof that would allow roofing manufacturers to reliably produce products with acceptable tear strengths while reducing their costs by, for example, using even lighter weight fiberglass mats.

BRIEF SUMMARY OF THE INVENTION

Briefly, therefore, the present invention is directed to a chemically-modified, air-blown asphalt comprising an air-blown asphalt and polyphosphoric acid.

The present invention is also directed to an asphalt roofing product comprising a chemically-modified, air-blown asphalt.

Additionally, the present invention is directed to an improved process for manufacturing an asphalt roofing product, wherein the improvement comprises using a chemically-modified, air-blown asphalt in the manufacture of said asphalt roofing product.

Further, the present invention is directed to a process for modifying an asphalt, wherein the process comprises air blowing the asphalt and mixing polyphosphoric acid with the asphalt before, during, or after the air blowing or a combination thereof to form a chemically-modified, air-blown asphalt that is suitable for use in preparing a roofing product.

The present invention is also directed to a chemically-modified, air-blown asphalt, that is formed by the process for modifying an asphalt so that it is suitable for use in preparing a roofing product, wherein the process comprises air blowing the asphalt and mixing polyphosphoric acid with the asphalt before, during, or after the air blowing or a combination thereof to form a chemically-modified, air-blown asphalt that is suitable for use in preparing a roofing product.

Still further, the present invention is directed to a roof that comprises an asphalt roofing product that comprises a chemically-modified, air-blown asphalt comprising an air-blown mixture of asphalt and polyphosphoric acid.

Furthermore, the present invention is directed to an improved process for constructing a roof, wherein the improvement comprises using an asphalt roofing product that comprises a chemically-modified, air-blown asphalt comprising an air-blown mixture of asphalt and polyphosphoric acid The present invention is also directed to a method of preparing a polymer-modified, air-blown asphalt having a reduced polymer concentration, the method comprising:

air blowing an asphalt and mixing polyphosphoric acid with the asphalt before, during, or after the air blowing or a combination thereof to chemically modify the air-blown asphalt; and mixing one or more polymer modifiers with the chemically-modified, air-blown asphalt to modify said asphalt and to form the polymer-modified, air-blown asphalt having a reduced polymer concentration;

wherein the polymer-modified, air blown asphalt having a reduced polymer concentration has certain physical properties and a total concentration of polymer modifiers that is less than what would be necessary to modify an identical air-blown asphalt that is not chemically modified with polyphosphoric acid to have substantially the same certain physical properties.

DETAILED DESCRIPTION OF THE INVENTION

Figure 1:
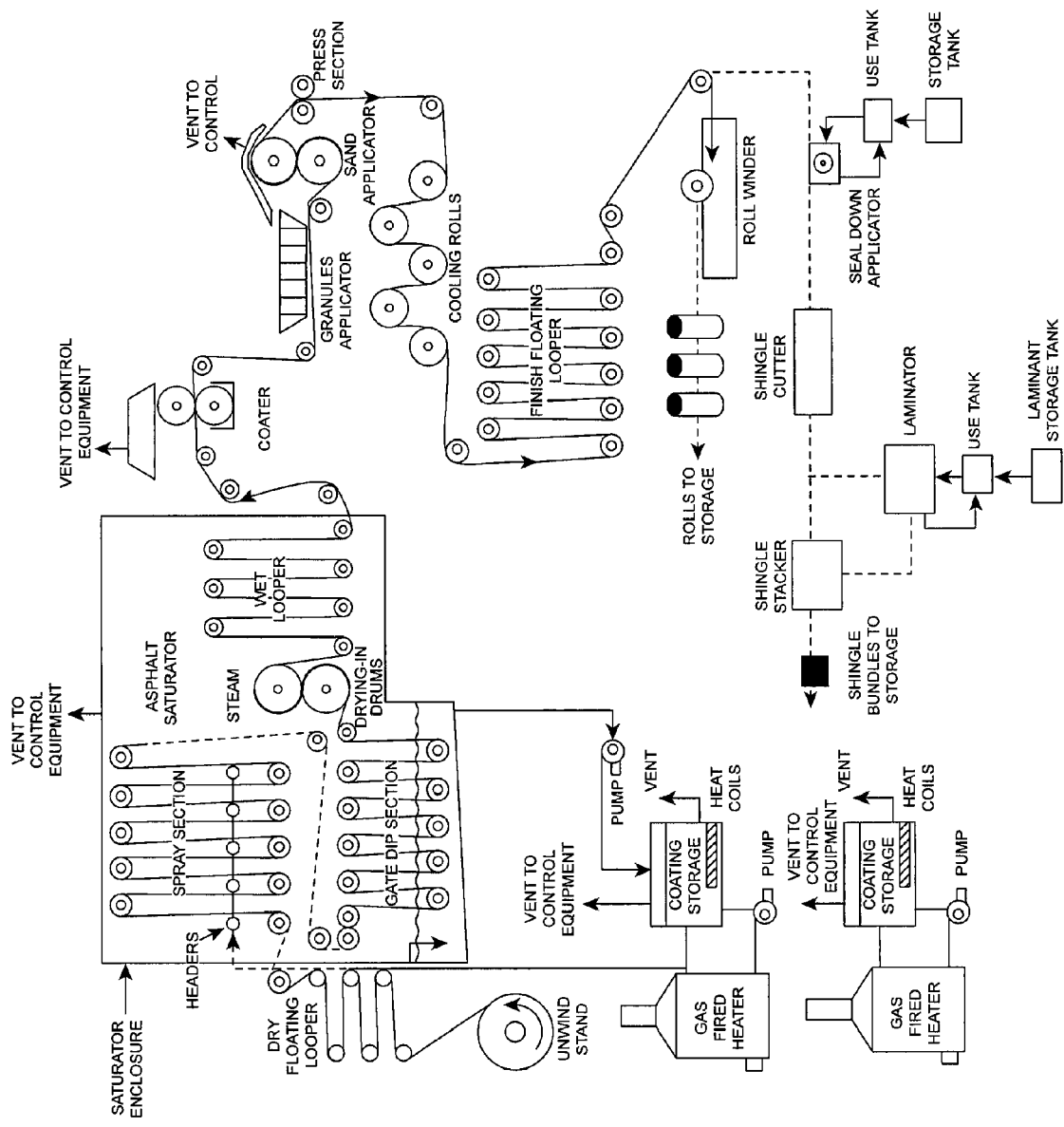
FIG. 1 is a flow diagram of a generic organic shingle or roll manufacturing process from the Midwest Research Institute (MRI). 1995. AP-42, 5$^{th}$ Edition, Volume 1, Chapter 11 Mineral Products Industry and printed in the Economic Analysis for Air Pollution Regulations: Asphalt Roofing and Processing, Final Report, (EPA-452/R-03-005, February 2003), prepared by Heller, Yang, Depro, Research Triangle Institute, Health, Social, and Economics Research, Research Triangle Park, N.C. 27709 for Linda Chappell, U.S. Environmental Protection Agency, Office of Air Quality Planning and Standards, Innovative Strategies and Economics Group, Research Triangle Park, N.C. 27711.

In accordance with the present invention, it has been discovered that the addition of polyphosphoric acid to asphalt can modify certain characteristics of the asphalt, rendering the acid-modified asphalt useful in the manufacture of asphalt roofing products. In particular, modifying an air-blown asphalt with polyphosphoric acid has resulted in significant improvements to the asphalt and the finished products including: increased adhesion of the asphalt to other roofing constituents (e.g., fibrous felts, mats, aggregates, and/or granules), increased tear strength of asphalt shingles made using the asphalt, increased elasticity, or a combination thereof. Thus, in one embodiment, the present invention is a roofing asphalt that is modified through air blowing and the addition of polyphosphoric acid.

Although this invention applies to all types of asphalt-based roofing products, there is a focus on fiberglass asphalt shingles because they constitute a large segment of the roofing market, especially in the United States.

I. Asphalt

Amongst their components, asphalts characteristically contain high molecular weight hydrocarbon compounds called asphaltenes. These are essentially soluble in carbon disulfide, and aromatic and chlorinated hydrocarbons. More particularly, asphaltenes are very complex molecules believed to consist of associated systems of polyaromatic sheets bearing alkyl side chains. The heteroatoms O, N and S as well as the metals V, Ni and Fe are also present in asphaltenes. Because of their complexity, the exact molecular structure of asphaltenes is currently not known and they are usually characterized based on their solubility. Asphaltenes are, broadly speaking, the fraction of an oil that is insoluble in n-heptane, n-hexane, or n-pentane and soluble in benzene/toluene. Additionally, asphalt comprises saturates, which are relatively light oils, and resins.

Asphalt displays viscous behavior at elevated temperatures and elastic behavior at low temperatures. At lower temperatures, the elastic properties dominate and the asphalt tends to resist flow. The properties that make asphalt suitable for roofing are its softness, flexibility, and strength. Asphalt has the ability to expand and contract with the surface upon which it is applied. This is because the saturants make it soft and flexible. On the other hand, the asphaltenes provide asphalt body, rigidity, and strength while resins bond the saturates and asphaltenes and give asphalt its resilience.

The quality of the asphalt typically depends on the source of the crude oil used in its production. A crude oil with a high flash point is generally desired for roofing applications, because combustion and vaporization of such light oils are most probable at higher flash points. In contrast, lower flash points tend to result in a harder asphalt that is better suited for paving applications.

Asphalt chemistry can be described on the molecular level as well as on the intermolecular (microstructural) level. On the molecular level, asphalt is a mixture of complex organic molecules that range in molecular weight from several hundred to several thousand and even in the millions. Although these molecules affect behavioral characteristics of the asphalt, the behavior of asphalt is largely determined by the microstructure of the asphalt, which is that of a dispersed polar fluid. Specifically, a continuous three-dimensional association of polar molecules (asphaltenes) dispersed in a fluid of non-polar or relatively low-polarity molecules (maltenes). All these molecules are capable of forming dipolar intermolecular bonds of varying strength. Since these intermolecular bonds are weaker than the bonds that hold the basic organic hydrocarbon constituents of asphalt together, they will break first and control the behavioral characteristics of asphalt. Therefore, asphalt's physical characteristics are a direct result of the forming, breaking, and reforming of these intermolecular bonds or other properties associated with molecular superstructures. The result is a material that behaves in an elastic manner through the effects of the polar molecule networks and in a viscous manner because the various parts of the polar molecule network can move relative to one another due to the dispersion in the fluid non-polar molecules.

As mentioned above, the present invention is not limited to any particular asphalt or combination of asphalts. For example, the asphalt may be naturally occurring asphalt or a manufactured asphalt produced by refining petroleum. Further, appropriate asphalts may include straight-run fractional-derived asphalts, cracked asphalts, asphalts derived from processing such as asphalt oxidizing, propane deasphalting, steam distilling, chemically modifying, and the like. The asphalt may be either modified or unmodified, and blends of different kinds of asphalt may be used. Although any asphalt may be used, it is preferred that a roofing product comprises an asphalt or combination of asphalts having one or more physical properties that make it suitable for a particular application. The selection of such an asphalt or combination of asphalts is well known to those of skill in the art. Examples of commercially available asphalts that may be suitable for preparing asphalt roofing products of the present invention include residua from Alaskan North Slope/Waxy Light Heavy crude blend, Arabian Heavy crude, Arabian Light crude, Boscan or Bachaquero (Venezuelan), Wood River, and the like.

II. Polyphosphoric Acid

A polyphosphoric acid is a series of oxyacids of phosphorous having the general chemical formula $H_{n+2}(P_nO_{3n+1})$. More specifically, polyphosphoric acids occur in the $P_2O_5$—$H_2O$ system and have a $P_2O_5$ content that is above about 74 percent. Polyphosphoric acids are complex mixtures of ortho- (n=1), pyro-(n=2), tri-(n=3), tetra (n=4), and longer chain polymer species, the proportions of which are a direct function of the $P_2O_5$ content of the acid. Although polyphosphoric acids may be referred to in terms of $P_2O_5$ content, polyphosphoric acids are typically referred to in terms of an equivalent $H_3PO_4$ (phosphoric acid) concentration or percentage. Preferably, the polyphosphoric acid used in the modification of the asphalt has an $H_3PO_4$ equivalent concentration of at least about 100%. More preferably, the polyphosphoric acid has an $H_3PO_4$ equivalent concentration of at least about 105%. Still more preferably, the polyphosphoric acid has an $H_3PO_4$ equivalent concentration of at least about 110%. Even more preferably, the polyphosphoric acid has an $H_3PO_4$ equivalent concentration of at least about 115%. Examples of appropriate polyphosphoric acids include acids having a $H_3PO_4$ equivalent content of 105% ($P_2O_5$ content of about 76.05%), a $H_3PO_4$ equivalent content of 115% ($P_2O_5$ content of about 83.29%), or a $H_3PO_4$ equivalent content of 116.4% ($P_2O_5$ content of about 84.31%), which are commercially available from ICL Performance Products, LP.

Polyphosphoric acids are not water-based and are less corrosive than water-based phosphoric acids, which is advantageous over water-based phosphoric acids. For example, the mixing of phosphoric acid with hot asphalt could result in foaming and splattering, whereas polyphosphoric acids are readily incorporated with little or no foaming and splattering.

Preferably, the amount of polyphosphoric acid added to the asphalt is an effective amount, that is to say, an amount that increases the adhesion between the asphalt and other roofing constituents such as felts, organic and fiberglass mats, aggregate, etc. compared to an identical modified asphalt that contains no polyphosphoric acid. More preferably, the polyphosphoric acid is added to the asphalt in an amount that achieves the maximum adhesion benefit. Although this optimum amount depends on several factors including the type of asphalt (i.e., the chemical composition of the asphalt), the types of other roofing constituents used to make a roofing product, the moisture content of the asphalt and the aggregate, the inclusion of polymer additives, etc., it may be readily determined through routine empirical testing. In general, however, it is believed that adhesion improvements may be observed by adding as little as about 0.05% by weight of polyphosphoric acid in the asphalt. Preferably, the amount of polyphosphoric acid added to the asphalt is at least about 0.1% by weight of the asphalt. More preferably, the amount of polyphosphoric acid added to the asphalt is at least about 0.2% by weight of the asphalt. Still more preferably, the concentration of polyphosphoric acid added to the asphalt is at least about 0.5% by weight of the asphalt, or even at least about 0.7% by weight of the asphalt.

Importantly, "percentages by weight" or alternatively "weight percent" as used herein refer to the percentage by weight of a material based on the weight of the asphalt. Further, the amount of a compound added to asphalt may also be referred to as a "concentration." Still further, it is to be noted compounds or chemicals added to asphalt such as the polyphosphoric acid may react with other chemicals or constituents in the asphalt or those added thereto to form one or more different chemicals or compounds (see below). That being said, it is typical for those of skill in the art to describe the composition of a modified asphalt in terms of the ingredients and the amounts added to an asphalt even though a portion or all of the added chemical/compound/ingredient may react and form one more different chemicals/compounds. For example, it is consistent with this convention to refer to an asphalt modified, for example, by adding 1% polyphosphoric acid thereo as a chemically-modified asphalt having a concentration of polyphosphoric acid of 1% by weight.

It has also been discovered that the adhesion may be detrimentally affected in certain circumstances by including an excessive amount of polyphosphoric acid. Although what may be an excessive amount depends on the particular asphalt, and without being held to the following, it is currently believed that adding more than about 2% of polyphosphoric acid to an asphalt is likely to be detrimental to adhesion. In fact, it is currently believed that it is preferred to include no more than about 1.5% of polyphosphoric acid in the asphalt binder. That being said, determining what concentration of polyphosphoric acid that detrimentally affects adhesion is a matter or routine testing to those of ordinary skill in the art, and it is quite possible that concentrations of polyphosphoric acid exceeding 2% in certain asphalt binders may be beneficial or non-detrimental to adhesion.

In view of the foregoing, in one embodiment of the present invention the polyphosphoric acid is at a concentration that is within a range of about 0.05 to about 2.0% by weight of the asphalt. Preferably, the polyphosphoric acid is at a concentration that is within a range of about 0.5 and about 1.5% by weight of the asphalt binder. More preferably, the polyphosphoric acid is at a concentration that is within a range of about 0.7 and about 1.2% by weight of the asphalt binder.

III. Air Blowing Asphalt

Prior to initiating the operations necessary for producing asphalt roofing products, the asphalt is prepared through a process called "blowing." The blowing process, which involves the oxidation of asphalt by bubbling gas (e.g., air, oxygen and/or oxygen and inert gas such as nitrogen and helium) through it when it is in liquid form, results in an exothermic reaction that often requires cooling (e.g., by a water-cooled jacket or other means). For example, the air flow blown through the converter usually ranges from about 220 to about 650 liters (STP) per hour/liter of processed asphalt, and the exothermic nature of the reaction can increase the asphalt temperature from about 400° F. to 500-550° F. The oxidation may take place over a time period spanning from about 1 hour to about 10 hours or even longer, depending on the desired characteristics of the roofing asphalt. The processing time is dependent on the process temperature, the air flow rate, the characteristics of the asphalt, and the specifications of the desired product.

Air blowing changes properties such as softening point and penetration rate of the asphalt. In general, the air blowing process increases the penetration for a given softening point so that the asphalt is less brittle and susceptible to cracking during thermal cycling. Thermal cycling is the change in temperature from hot to cold as might be encountered in asphalts used in roofing. The asphalt will get extremely hot from direct sunlight but will become extremely cold at night. To be an effective roofing asphalt, the asphalt preferably has a sufficiently high penetration so that it does not become brittle or crack during the thermal cycling and a sufficiently high softening point to remain viscous enough so that it will not run off the roof during hot days.

The air blowing process may also include introducing what is referred to in the industry as "catalysts," which tend to speed up the oxidation process. A widely used catalyst is ferric chloride ($FeCl_3$) may also be introduced or used in the blowing process.

In accordance with the present invention, the polyphosphoric acid may be added by blending it into the asphalt prior to the air blowing process; by adding it to the asphalt in the converter during the process (preferably early in the process, usually within about the first hour); before and during the air blowing process; during and after the air blowing process; or before, during, and after the air blowing process. The blending of the asphalt and polyphosphoric acid may be accomplished by any appropriate means (e.g., paddles, blades, stirrers, rotation, etc.). Also, the polyphosphoric acid is preferably warmed before being added to the asphalt because this decreases its viscosity, which aids flowing and mixing. Without being bound to a particular theory, it is believed that the polyphosphoric acid is not acting as a "catalyst" because increased oxidation reaction rates have not been observed. Rather, again without being bound to a particular theory, it is currently believed that the polyphosphoric acid is reacting with asphaltene molecules in the asphalt, which are polar and tend to agglomerate rather than to be uniformly dispersed. Specifically, it is believed the polyphosphoric acid is reacting with active sites such hydroxyl, amine, sulfur, or other groups of the asphaltenes thereby breaking up the agglomerates. The dispersed asphaltene particles are then better able to form a long range network structure that is believed to produce a more elastic asphalt compared to an otherwise identical asphalt. Additionally, it is believed the polyphosphoric acid apparently increases the concentration of asphaltenes in the asphalt. How this increase occurs is not entirely understood but without being bound to a particular theory it is believed that the acid may react with some hydrocarbon compounds, modifying their functional groups and converting them into relatively more polar species, which now behave like other asphaltene compounds. Alternatively, there may be no actual increase in asphaltenes or asphaltene-like compounds and the change may possibly be the result of the polyphosphoric acid somehow allowing/causing/facilitating a more effective "recovery" of aphaltenes using the SARA test method for which the heptane insoluble fraction is considered to be asphaltenes. Regardless of mechanism and without being held to a particular theory, the chemical changes caused by the addition of polyphosphoric acid are believed to be the reason for the improved physical characteristics such as improved adhesion, which, among other things, affects fiberglass shingle tear strength. For example, the addition of polyphosphoric acid (about 0.9 weight percent) was observed to increase tear strength by about ten percent for an unfilled asphalt coating. Such an increase would probably make the difference between a fiberglass shingle complying or failing the 1,700 gram standard. Other beneficial effects from the addition of polyphosphoric acid that may be observed include increased adhesion to aggregates and to ceramic granules, increased flexibility as the temperature is lowered and/or increased penetration at low temperature compared to otherwise identical asphalts or products.

Although polyphosphoric acid is not believed to be a "catalyst," it may be used to decrease the significant cost of air blowing, which is energy intensive, and the use of catalysts, which tend to be relatively expensive. The reduction or elimination of ferric chloride catalysts would also be desirable because it is corrosive to air blowing equipment and contributes to air pollution. Specifically, because of the increase in adhesiveness from the addition of polyphosphoric acid, it is believed that it may be possible to improve an air blowing operation (e.g., by reducing the duration, the temperatures(s), the amount of airflow, etc., or a combination of such actions) and to reduce or eliminate the use of catalysts, or a combination thereof while attaining acceptable properties for the asphalt.

IV. Mineral Fillers

The asphalt of the present invention may also comprise mineral fillers. Any mineral filler of combinations of fillers known to be appropriate for inclusion in roofing asphalt and/or a mineral filler or fillers that are conventionally used in roofing asphalt may be used in the polyphosphoric acid modified asphalt of the present invention. A typical mineral filler is limestone. Another typical mineral filler is stone dust. Typically, mineral filler particles are characterized in terms of sieve mesh size usually in terms of percentage remaining on, of falling through a particular screen size. For example, in one embodiment the particles size distribution of the mineral filler is an amount between about 75% and about 95% smaller than 200 mesh. In another embodiment the particle size distribution is an amount between about 80% and about 90% smaller than 200 mesh. The present invention, however, is not limited to any particular particle size distribution for mineral filler, if present. If included, a mineral filler typically is at a concentration that is at least about 50 percent by weight and no greater than about 70 percent by weight of the total formulation. In another embodiment of the present invention the filler is limestone having a particle size distribution that is about 85% smaller than 200 mesh, and it is at a concentration that is at least about 55 percent by weight and no greater than about 65 percent by weight of the total formulation.

V. Polymer Modifiers

The asphalt of the present invention may also comprise a polymer modifier. In general, the polymers typically modify the asphalt by tending to provide integrity at different temperatures, increasing the useful temperature range, and increasing the elastic component of the asphalt. Typical polymer asphalt modifiers include triblock or branched styrene-butadiene-styrene copolymers (SBS), diblock styrene-butadiene copolymers (SB) styrene block copolymer (SBC), styrene-butadiene-rubber (SBR), and atactic polypropylene (APP), functionalized polyolefins (APO), and reactive ethylene terpolymers (e.g., Elvaloy®). APP, APO and SBS, however, are the most popular modifiers and provide different flexibility and strength characteristics to the asphalt. Specifically, SBS is an elastomer that enhances cold-weather flexibility and becomes fluid at a relatively low temperature (compared to other polymers). It also has higher tensile strength but poorer elongation than the polyolefin modifiers. Polyolefins are thermoplastic polymers that soften when heated and melt at significantly higher temperatures. In generally, polyolefin modifiers are considered resistant to weather exposure, whereas SBS modifiers typically require surface protection against ultraviolet radiation. Both of these modifiers are used to attempt to raise the softening point of asphalt without reducing its flexibility or weatherability.

Although polymer modification is typically considered beneficial, the cost associated with adding polymers is high. As such, polymer modifiers are typically only added to asphalts used to make very high-grade shingles and a small segment of commercial roofing products. Despite the high cost, these commercial roofing asphalts contain a lot of polymer—typically between about 4 and about 15 weight percent. This high usage of polymers results in the amount of polymers used in these commercial roofing products being about equal to the amount of polymers used in paving asphalt in the United States. In view of the foregoing, manufacturers of such commercial roofing products and high-end shingles are always searching for ways to reduce the amount of polymers in their asphalts while still attaining the desired properties. Advantageously, it is believed the addition of polyphosphoric acid to asphalt, in accordance with the present invention, may be used by such manufacturers to reduce polymer usage in certain circumstances. In particular, it is believed that by adding an appropriate amount of polyphosphoric acid to the asphalt the amount of polymer may reduce by an amount between about 10 and about 30 percent. That being said, even reductions in polymer amounts of less than about 10 percent would likely be considered to be commercially advantageous.

If included, the concentration of polymer modifier added to the polyphosphoric acid-modified asphalt of the present invention is preferably consistent with the concentration(s) considered appropriate for the particular application and the associated variables such as type of asphalt, type of roofing product, etc. Typically, the concentration of polymer modifiers is between about 8 and about 12% by weight of the asphalt. Nevertheless, it is possible that the concentration of polymer may be below about 8 weight percent, but it is unlikely to be greater than 15 weight percent.

In another embodiment, however, the polyphosphoric acid-modified asphalt of the present invention is preferably not modified with polymers. Stated another way, in this embodiment the asphalt is preferably substantially free of polymer modifiers. Specifically, the concentration of such additives is, in order of increasing preference, less than about 1.0, 0.5, 0.2, 0.1, 0.05, or 0.01% by weight of the asphalt or even 0%.

V. Types of Asphalt Roofing Products

Asphalt roofing products are popular among consumers because of their excellent waterproofing capabilities. The specific type of asphalt product desired by an end user varies depending on a number of factors. These factors include the end-user's budget, the ease of installation, the type of surface area to which the product is being applied, and the climate and weather patterns of the location where the roofing products are installed. Asphalt roofing products are typically considered to fall within four main categories: asphalt-saturated felt, roll roofing (smooth and surfaced), asphalt shingles (fiberglass and organic), and modified bitumen roofing (MBR).

A. Asphalt Felts

Asphalt felts are typically used as inner roof coverings for protecting and sealing because they tend to be water repellent, tolerant of temperature fluctuations, and resistant to breakdown and decay caused by exposure to the elements.

B. Roll Roofing

Both surfaced (i.e., surface aggregate) and smooth roll roofing are outer roof coverings commonly used for low-cost housing and utility buildings in place of asphalt shingles. They are almost always purchased in rolls that are 36 to 38 feet long and approximately 36 inches wide, which tends to simplify the roof application process. Consumers desiring an inexpensive substitute that is simpler to install than asphalt shingles tend to use roll roofing.

C. Asphalt Shingles

Asphalt shingles have different characteristics depending on whether their base mat is organic felt or fiberglass. Organic felts are typically produced from paper fibers, rags, wood, or a combination thereof, whereas fiberglass base mats are comprised of thin glass fibers. Organic felt-based asphalt shingles have the lowest possible American Society of Testing and Materials (ASTM) fire-resistant rating (i.e., Class C). In contrast, fiberglass shingles have the highest fire-resistant rating (Class A). Organic shingles, however, tend to be more flexible than fiberglass shingles, especially at cold temperatures.

Regardless of the type of mat, asphalt shingles are commonly manufactured as strip shingles, interlocking shingles, and large individual shingles. Strip shingles are usually rectangular and measure about 12 inches in width and 36 inches in length. The three-tab shingle is the most common strip shingle. The three-tab shingle gives the appearance of three separate shingles and tends to be stronger and easier to apply than strip shingles. Interlocking shingles come in various shapes and with different locking devices, which provide a mechanical interlock that tends to increase resistance to damage caused by strong winds. As for large individual shingles, they are generally rectangular or hexagonal in shape.

If climate or weather patterns are of concern to the end user, the type of asphalt shingle desired depends on the climatic conditions. Compared to organic-based asphalt shingles, fiberglass-based shingles are generally better suited for warmer climates because they can stiffen in cold climates. Also, fiberglass-based shingles are preferred for warm climates because they are generally more weather resistant and have the highest ASTM fire-resistance rating. This is because fiberglass-based shingles tend to contain more coating asphalt, which provides greater resistance to warping, rotting, blistering, and curling.

The desired shape of asphalt shingles also varies depending on the geographic area of application. The most common shape is the three-tab shingle, which has two slots cut in its front edge. These slots serve to provide stress relief as the shingle expands and contracts with weather. In areas often characterized by strong winds, the T-lock shingle tends to be preferred because these shingles are locked to the shingle above and below it when installed on a roof.

D. Modified Bitumen Membranes

Modified bitumen membranes have a number of uses. They can be applied as the primary material for new roofs, as a cover for existing roofs, and as cap sheets in built-up roofing (BUR) applications. Typically, for each of these applications, styrene-butadiene-styrene (SBS)-based membranes are installed using hot asphalt, a torch, cold process adhesives, or self-adhesives. In contrast, atactic polyolefin (APP and APO)-based membranes are usually only installed with a torch or cooled process adhesives. Both SBS- and polyolefin-based membranes are usually purchased in rolls and are usually applied in multiple layers. The advantages of modified bitumen membranes over other roofing materials include versatility in both steep- and low-slope roofing applications and their puncture resistance, durability, and weatherability.

Consumers may select modified bitumen membranes if they desire a product that is versatile and able to suit a wide variety of project needs. These membranes are suitable for both steep and low-slope applications and have the durability and flexibility necessary for free span buildings, such as aircraft hangars and warehouses. In addition, modified bitumen membranes are effective in both cold and warm weather climates.

VI. Production of Roofing Products

After asphalt is prepared through the blowing process, it is used in the production of asphalt-saturated felt, surfaced and smooth roll roofing, fiberglass and organic (felt-based) shingles, and modified bitumen membranes. For each of these products, with the exception of modified bitumen membranes, production typically consists of the following six primary operations:

(1) felt saturation—saturating organic felts/mats with asphalt (typically a low softening point asphalt);
(2) coating—applying modified asphalt and a mineral filler on the saturated organic felts/mats or fiberglass felts/mats;
(3) mineral surfacing—applying mineral granules to the bottom of the coated felts/mats;
(4) cooling and drying—using water-cooling and air-drying procedures to bring the product to ambient temperatures;
(5) product finishing—formatting (e.g., rolling or cutting) the cooled asphalt roofing products; and
(6) packaging the finished product.

The specific production process for each of the asphalt roofing products is the focus of the remainder of this section.

A. Manufacturing Asphalt Felts

One of the most basic asphalt roofing products is asphalt-saturated felt. It is produced using a blotter-like paper, called felt, that is made of cellulosic materials. Referring to FIG. 1, the production process typically begins at an unwind stand, where the felt is unrolled onto a dry looper. From the dry looper, the felt passes through a saturator, which is a tank typically filled with a soft or low softening point asphalt called saturant. The felt then moves over a series of rollers, where the bottom rollers are submerged into hot asphalt at a temperature of 205 to 250° C. (400 to 480° F.). In accordance with the present invention, the saturant, the hot asphalt, or both may comprise or be entirely a polyphosphoric acid-modified asphalt of the present invention. The next step in the production process involves heating the asphalt to ensure that it has penetrated the felt. The felt would not pass through the granule applicator unlike the production of surfaced roll roofing and shingles which are described below. Finally, the saturated felt passes through water-cooled rolls onto the finish floating looper and then is rolled and cut on the roll winder.

B. Manufacturing Roll Roofing

Surfaced and smooth rolls can be produced using either organic felt or a fiberglass mat as the base or substrate. Referring again to FIG. 1, which is also applicable to the typical production process for surfaced or smooth rolls. The first stage in the production process is asphalt saturation of organic felt. If a fiberglass mat is the substrate, however, then the felt saturation step is typically excluded. After this step is completed or skipped, either the saturated felt or fiberglass mat passes into the coater. The coater typically applies a "filled" asphalt coating, which is prepared by mixing asphalt (such as the polyphosphoric acid-modified asphalt of the present invention) and a mineral stabilizer in approximately equal proportions. The coater releases the filled coating onto the top of the felt or mat. Squeeze rollers then apply filled coating to the bottom of the felt or mat and distribute it evenly to form a thick base coating onto which surfacing materials will adhere.

If surfaced rolls are being manufactured, the asphalt sheet produced by the coater passes through the granule applicator next. Smooth roll production excludes this step. During the granule application stage, surfacing material is applied by dispensing granules onto the hot, coated surface of the asphalt sheet. The mineral surfacing found on asphalt products can also vary with talc and mica being the most frequently used. But coarse mineral granules, such as slate and rock granules, may be used as well. The selection of granules is the primary manner in which the appearance of surfaced roofing is affected. Typically, the granules are applied to the sheet as it passes through the press roll to force the granules into the asphalt coating.

Following the application of surfacing material for surfaced roll production, or the coating stage for smooth roll production, the asphalt sheet passes through the final production stages. The sheet is first cooled rapidly on water-cooled rolls and/or by using water sprays. Then, if surfaced rolls are being produced, the sheet passes through air pressure-operated press rolls used to embed the granules firmly into the coating. Asphalt sheets for both surfaced and smooth roll production are then air dried. A strip of asphalt adhesive is applied next, the purpose of which is to seal the loose edge of the roofing after it is installed. These processes are typically facilitated by a finish looper, which allows continuous movement of the sheet as it passes through each of these final production stages. It also serves to further cool and dry the sheet. The final stage of roll roofing production is the formation of the rolls. This takes place by passing the roofing sheet through a winder, where rolls are formed.

C. Manufacturing Asphalt Shingles

Organic felt and fiberglass mat-based shingle manufacturing involves the same production processes as surfaced and smooth roll roofing, with the exception of the final roll formation step. Instead of forming rolls with the roofing sheets, the sheets are passed through a cutter, which cuts the sheet into individual shingles. If the shingles are going to be made into laminated products, they must also pass through a lamination stage where laminant is applied in narrow strips to the bottom of the sheet.

D. Manufacturing Modified Bitumen Membranes

The production of modified bitumen membranes typically comprises combining a polymer modified asphalt (which, in accordance with the present invention comprises polyphosphoric acid) with a reinforcement and then applying mineral fillers, fire retardant additives, and/or surfacing. As mentioned above, polymer modification of an asphalt generally involves adding a thermoplastic or elastomeric polymer, such as APP, APO, SBC, or SBS. Also, as mentioned above, it is believed that the modification of asphalt with the polyphosphoric acid may allow manufacturers/users to decrease the amount of polymer modifiers while still attaining acceptable properties.

After the asphalt has been polymer modified, a reinforcement is added. The reinforcements most commonly used in modified bitumen production are polyester and fiberglass mats. Both polyester and fiberglass mats are used with SBS-modified bitumen, while polyester mats are most commonly used with polyolefin-modified bitumen. Polyester mats are generally regarded as superior to fiberglass mats as reinforcements in modified bitumen membranes because polyester has higher elongation and higher puncture resistance than fiberglass. But fiberglass has higher tensile strength than polyester.

Following the addition of reinforcement to the modified asphalt, fillers, fire-retardant additives, and/or surfacing may be applied. Surfacing of the membrane tends to protect the membrane from the elements. Surfacing may either be applied during production of the membrane or during installation of the roof. If it is applied during production, possible surfacing materials include: (a) granules that are pressed onto the top surface of the membrane; (b) a thin layer of fiberglass, or (c) thin sheets of copper, aluminum, or stainless steel. Surfacing applied during application of the membrane on a roof may consist of a coat of asphalt, loose aggregate, or a liquid aluminum roof coating.

VII. Examples

A. Softening Point and Penetration

The softening point is widely considered by those of skill in the asphalt shingle industry considered in the industry as the standard measure for evaluating the high temperature performance capability of an air-blown asphalt coating. The softening points for the tested asphalt formulations were determined in accordance with the ASTM D36 test method.

The softening points determination test and the following tests were all performed on air-blown shingle coatings that were filled or unfilled, and comprised about 0.9% by weight polyphosphoric acid (i.e., "acid-containing") or did not comprise additional polyphosphoric acid (i.e., "acid-free"). The asphalt used in this and the other tests was a Venezuelan flux and before being air blown it had a softening point of about 98° F. and a penetration at 25° C. of about 220 dmm. The asphalt was air blown at about 500° F. for about three hours using a laboratory still according to the following procedure. About 5,000 g of flux was heated to about 350° F. in the still. The polyphosphoric acid was 115% polyphosphoric acid (PLYANT™ available from ICL Performance Products LP) and was added and mixed with the asphalt using a spatula. The mixture was heated to about 450° F. and air was injected through the bottom of the still using a sparger so it tended to disperse evenly. An exothermic reaction took place and the system temperature increased and cooling was provided to maintain the temperature at about 500° F. The coatings that were "filled" comprised, in addition to the asphalt and polyphosphoric acid (as appropriate), about 65% by weight mineral filler that was 85% smaller than 200 mesh limestone from Franklin Minerals, Anderson Plant, Sherwood, Tenn. The mineral filler was also mixed with the asphalt with a spatula.

In addition to evaluating the temperature susceptibility, determining the softening points for asphalt coating formulations verifies that the comparative asphalt coating formulations were substantially equivalently prepared, except being acid-containing or acid-free, and, therefore, are suitable for direct comparison. Exemplary results are set forth in Table A below.

TABLE A

| | Sample No. | | | |
|---|---|---|---|---|
| | 1 | 2 | 3 | 4 |
| % PPA | 0.0 | 0.9 | 0.0 | 0.9 |
| % Filler | 0.0 | 0.00 | 65 | 65 |
| Softening Point | 223° F. | 223° F. | 252° F. | 251° F. |
| Penetration at 4° C. (dmm) | 14 | 22 | 4* | 11* |
| Penetration at 25° C. (dmm) | 17 | 23 | 8* | 11* |

*Penetration values in filled systems are approximated because the filler particles interfered with the test, but are still consistent with the trend described below.

Based on the results set forth in Table A, it may be discerned that the addition of polyphosphoric acid had little or no affect on the softening point of the asphalt but it resulted in a significant increase in the penetration values and regulated the penetration values as a function of temperature, which tend to indicate that the addition of polyphosphoric acid increased the flexibility of the asphalt and the flexibility of the asphalt tended not to be affected by the decrease in temperature.

Figure 2:
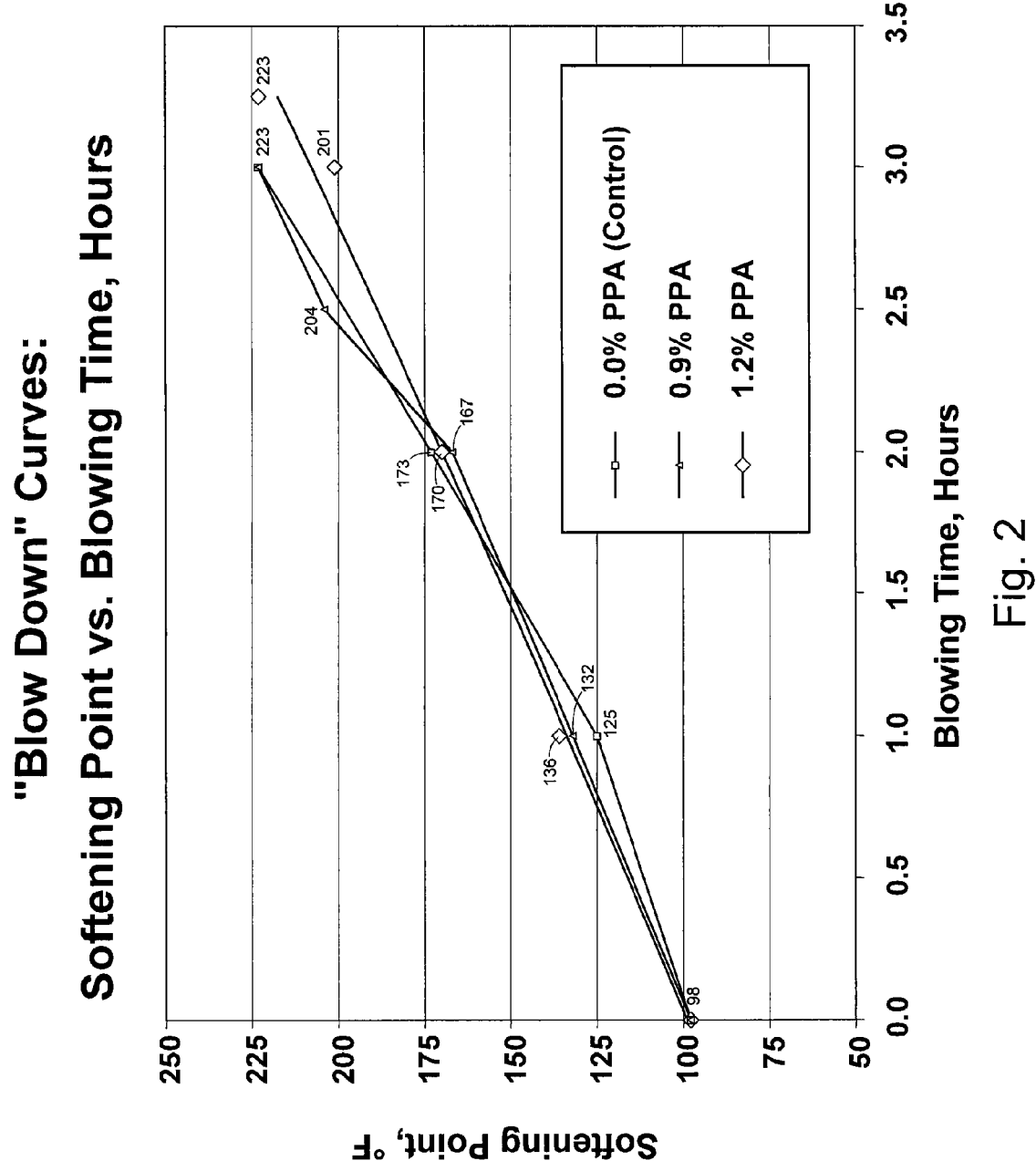
FIG. 2 is a graph presenting softening points of asphalts (modified with polyphosphoric acid and an unmodified asphalt) as a function of blowing time, wherein the softening point was determined according to ASTM D36.
Figure 3:
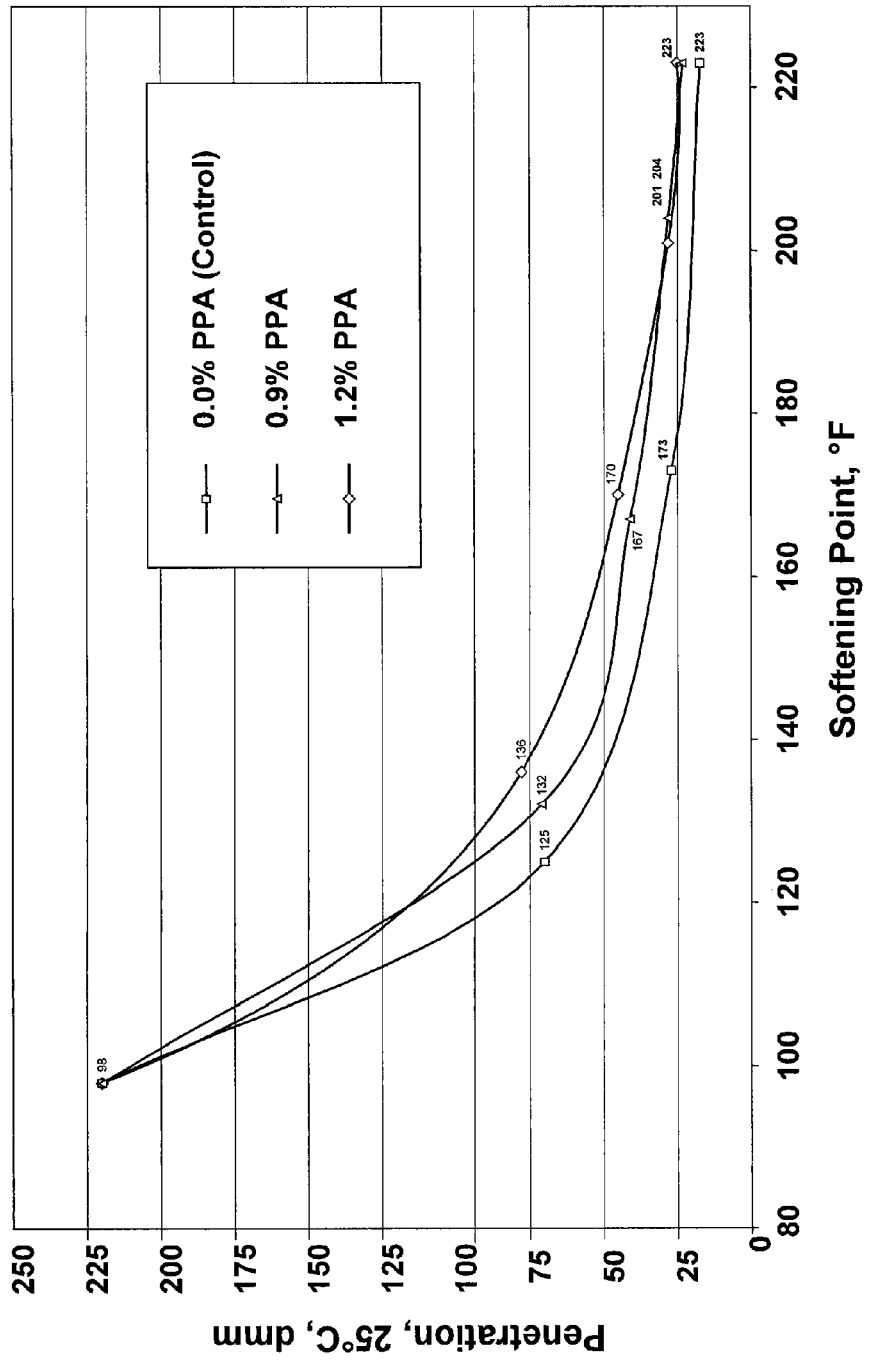
FIG. 3 is a graph presenting penetration of the asphalt in accordance with ASTM D5 as a function of softening point.

In addition to the foregoing, the "Blow Down" curves of FIGS. 2 and 3 were prepared comparing asphalt softening points as a function of blowing time and penetration as a function of softening point. For these tests, an addition of 1.2 weight percent of polyphosphoric acid was also evaluated. As depicted in FIG. 2 and consistent with the foregoing results, there was not a significant difference in the softening point caused by the addition of polyphosphoric acid (i.e., the trend indicated by the points is that, within the experimental variation, the softening point increase observed over blowing time was substantially the same regardless of the addition of the polyphosphoric acid. In contrast, FIG. 3 shows a significant increase in asphalt penetration (ASTM D5) at various temperatures by introducing polyphosphoric acid with the addition of 1.2 percent polyphosphoric acid resulting in a greater increase than the addition of 0.9 percent. The difference appeared to be the more pronounced at temperatures within the range of about 110° F. to about 160° F. and decreasing to about 220. Further, it may be discerned that the benefit of the extra polyphosphoric acid (1.2% versus 0.9%) tended to change over a range of temperatures. Specifically, from about 100° F. to about 120° F. a greater the degree of penetration was greater with the 0.9%, from about 120° F. to about 195° F. the degree of penetration was greater with the 1.2%, and from about 195° F. to about 220° F. the degree of penetration for the two was about the same.

B. Cold Temperature Mandrel Bend

The roofing industry uses the cold temperature mandrel bend test to assess an asphalt coating's low temperature properties. The test is typically performed to subjectively assess a coating formulation's low temperature flexibility and thermal crack resistance. Those of skill in the industry generally consider a change in the temperature at which the coating fails of as little as 5° F. to be significant. Typically, it is preferred for the lower failure temperatures.

The cold temperature mandrel bend test results were determined in accordance with the ASTM D 5147 (modified) test method, which is designed for testing finished shingle products. For these tests it was performed on coupons of cast coating material with dimensions of about 1 inch×6 inches× 0.125 inch. The one-eighth of an inch thickness was selected to approximate the thickness of the coating in a typical shingle. For each temperature tested, five coupons were tested shortly after being manufactured and another five were subjected to dark oven aging before being subjected to the mandrel test. The mandrel had a diameter of one inch and the coupons were bent about the mandrel approximately 180° over a period of approximately two seconds. Temperature was reduced in 5° F. increments until four of the five coupons broke, which is considered failure. The samples were conditioned at each test temperature for 60±5 minutes before being bent. The results are set forth in Table B below.

TABLE B

| | Sample | | | | | | | |
|---|---|---|---|---|---|---|---|---|
| | 1 | | 2 | | 3 | | 4 | |
| | Unfilled | | | | Filled | | | |
| | PPA-free | | PPA | | PPA-free | | PPA | |
| Temp (° F.) | Original | Aged | Original | Aged | Original | Aged | Original | Aged |
| | | | | Pass or Fail (# Passed/# Failed) | | | | |
| 120 | Pass (5/5) | Pass | Pass (5/5) | Pass | Pass (5/5) | Pass | Pass (5/5) | Pass |
| 115 | | | | | | | | |
| 110 | | | | | | | | |
| 105 | | | | | | Fail (5/5) | | |
| 100 | | | | | | — | | |
| 95 | | | | | | | | |
| 90 | | | | | | | | |
| 85 | | Fail (5/5) | | | | | | Fail (4/5) |
| 80 | | — | | Fail (4/5) | | | | — |
| 75 | | | | — | | | | |
| 70 | | | | | | | | |
| 65 | | | | | | | | |
| 60 | | | | | | | | |
| 55 | | | | | | | | |

TABLE B-continued

| | Sample | | | | | | | |
|---|---|---|---|---|---|---|---|---|
| | 1 | | 2 | | 3 | | 4 | |
| | Unfilled | | | | Filled | | | |
| | PPA-free | | PPA | | PPA-free | | PPA | |
| Temp (° F.) | Original | Aged | Original | Aged | Original | Aged | Original | Aged |
| | Pass or Fail (# Passed/# Failed) | | | | | | | |
| 50 | | | | | | | Pass (4/5) | |
| 45 | Pass (4/5) | | | | | | | |
| 40 | Fail (1/5) | | | | Fail (0/5) | | | |
| 35 | — | | Pass (4/5) | | — | | | |
| 30 | | | Fail (0/5) | | | | Pass (4/5) | |
| 25 | | | — | | | | Pass (3/5) | |
| 20 | | | | | | | Fail (0/5) | |

As is apparent from the foregoing results, the addition of 0.9% PPA resulted in about a 5° F. improvement for the unfilled coatings (original and aged samples 1 and 2). A more dramatic improvement of about 20° F. was realized for the filled coatings (original and aged samples 3 and 4). Thus, it appears that the low temperature flexibility and thermal crack resistance of a roofing asphalt may be improved by the addition of polyphosphoric acid. Stated another way, in view of the bending, softening point, and penetration test results, adding polyphosphoric acid resulted in a higher penetration and flexibility of the asphalt while not significantly changing the asphalt's softening point. Thus, adding polyphosphoric acid resulted in a wider acceptable temperature range in which the asphalt may be used.

C. Load & Strain Properties From Direct Tension

In order to obtain some insight into the load-strain properties of the asphalt coatings, the samples were tested according to a Direct Tension protocol that was developed for testing paving asphalts. The testing procedures were developed by the American Association of State Highway and Transportation Officials and the protocol is referred to as AASHTO T 314, which was modified for coatings by not aging the material and by performing the tests on samples at about 25° C. The results are set forth in Table C below.

TABLE C

| | Sample | | | | | | | |
|---|---|---|---|---|---|---|---|---|
| | 1 | | 2 | | 3 | | 4 | |
| | Unfilled | | | | Filled | | | |
| | PPA-free | | PPA | | PPA-free | | PPA | |
| | Original | Aged | Original | Aged | Original | Aged | Original | Aged |
| Stress (MPa) | 0.14 | 0.50 | 0.05 | 014 | 0.46 | 0.42 | 0.19 | 0.75 |
| % Strain (pulling distance in mm) | ≧10.0 | 9.06 | ≧10.0 | 6.8 | ≧10.0 | 3.50 | ≧10.0 | 7.50 |

As is indicated, the results for the original samples show that the strains exceeded the limits of the test procedure. It is believed that measurable strain values may be obtained by decreasing the temperature of the samples. Regardless of not being able to determine exact strain values, the results for the original samples (both filled and unfilled) suggests that the addition of polyphosphoric acid enabled the coatings to exhibit lower stresses. The results for the aged samples are not as consistent, however. In the case of the aged filled samples, the one containing the polyphosphoric acid withstood a much higher strain (and correspondingly attained a higher stress value) than the polyphosphoric acid-free sample. The aged unfilled sample containing polyphosphoric acid appears to have withstood a lower strain value and its stress remained very low compared to the polyphosphoric acid-free samples. It is not clear whether this is merely an anomaly of this limited study or an accurate result. It is believed that the most practical evaluation is that of the aged filled samples and those results indicate that the use of the polyphosphoric acid caused the coating to be tougher while still having a reasonable amount of ductility.

D. Granule Adhesion—Rub Loss

Simulated shingle specimens were prepared with both the filled and unfilled coatings and were evaluated for granule adhesion using the ASTM D4977, Granule Adhesion to Mineral Surface Roofing by Abrasion test. The specimens 3"×2"×0.125" and were prepared with #11 white roofing granules (+8 mesh) in the lab according to the following procedures by spreading hot coating on a glass mat, sprinkling a pre-determined amount of granules on top and pressing them down with rollers. The results are set forth in Table D below.

TABLE D

| | Sample | | | |
|---|---|---|---|---|
| | 1 Unfilled | 2 | 3 Filled | 4 |
| | PPA-free | PPA | PPA-free | PPA |
| Granule Adhesion Loss (grams) | 0.97 | 0.92 | 0.87 | 0.63 |

As is evident, the addition of the polyphosphoric acid to both the unfilled and filled asphalts improved the adhesion of the granules.

E. Granule Adhesion—Boil Test

The Texas Boil Test (Texas Method Tex-530-C) or ASTM D3625, "Effect of Water on Bituminous-Coated Aggregate Using Boiling Water" was selected as a screening test to assess the adhesion of roofing granules to the asphalt coatings. The Texas Boil Test is a subjective test that is widely used in the asphalt binder industry to assess the adherence of an asphalt binder to a particular paving aggregate. The test was modified by using roofing granules instead of paving aggregate.

For the Texas Boil Test, only the unfilled asphalt formulations (acid-free and polyphosphoric acid-containing) were tested. Instead of paving aggregate, #11 white roofing granules (+8 mesh) were used. In accordance with the test procedures, the asphalt coating formulations were mixed with the roofing granules and the temperature of the mixture was increased to about 135° C. Upon reaching about 135° C., the mixture was poured into a container (e.g., a beaker) of boiling water and the contents were boiled for about ten minutes. The mixture was then separated from the water and allowed to dry at room temperature. The dried mixture was evaluated by visually estimating the percentage of aggregate that is covered with adhering asphalt binder. Both the acid-free and polyphosphoric acid-containing unfilled asphalt formulations exhibited complete or 100% adhesion, there was no evidence of dis-bonding.

These results tend to indicate that the use of polyphosphoric acid tends not to decrease the adhesion of the coating to the granules.

F. Tear Strength

The effect on tear strength provided by the addition of polyphosphoric acid was determined by performing ASTM D1992, Test Method for Propagation Tear Resistance of Plastic Film and Thin Sheeting by Pendulum Method, except that the test was modified by testing a standard fiberglass shingle mat that was impregnated with exact quantities of both the filled and unfilled coatings employing identical process parameters. The results are set forth in Table E below.

TABLE E

| | Sample | | | |
|---|---|---|---|---|
| | 1 Unfilled | 2 | 3 Filled | 4 |
| | PPA-free | PPA | PPA-free | PPA |
| Tear Strength MD (grams) | 1,222 | 1,568 | 1,408 | 1,696 |
| Tear Strength CD (grams) | 1,587 | 1,798 | 2,073 | 2,170 |

The foregoing results indicate that the polyphosphoric acid improved the asphalt coating's tear strength by about 28% for the MD, unfilled and by about 20% for the MD, filled. This suggests superior bonding or increased adhesion with the fiberglass mat and improved tear resistance.

G. Weathering

Figure 4:
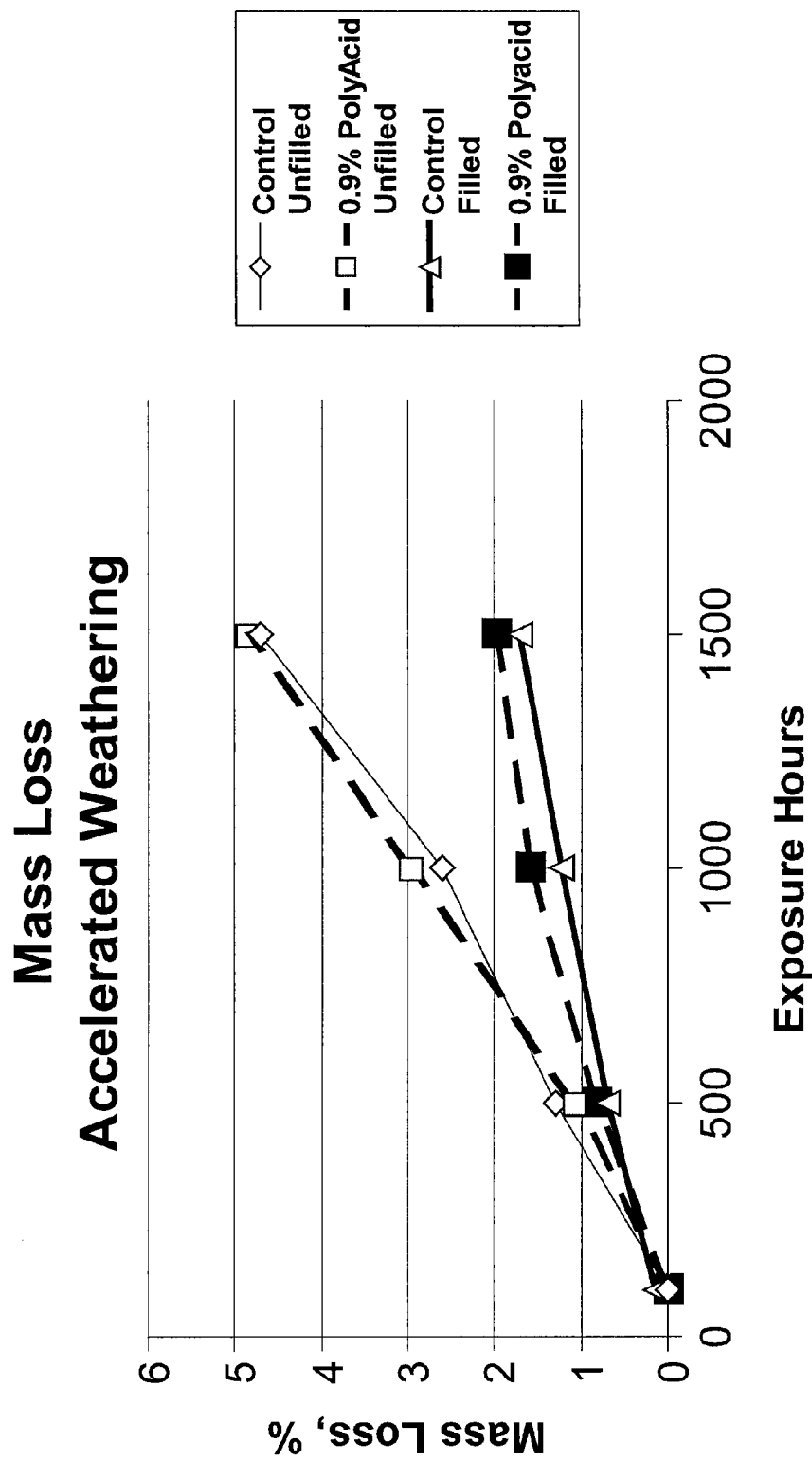
FIG. 4 is a graph presenting mass loss in percent as a function of the number of exposure hours in accordance with ASTM D4798 for filled and unfilled asphalts that were and were not modified with polyphosphoric acid.

First, the asphalts were subjected to an accelerated aging process using a xenon arc for 2500 hours and none of the samples exhibited any pinholes. After eight months of outdoor aging each sample was free of pinholes. The presence of pinholes would suggest the coating is deteriorating. The acid-modified coating had no pinholes and therefore is deemed acceptable according to the ASTM test. Further, the results for the polyphosphoric acid-containing samples were not different from the acid-free control. Thus, it is believed that the addition of polyphosphoric acid did not negatively affect the aging qualities of the asphalt. Also, the asphalt samples were tested for weathering resistance in accordance ASTM D4798. The results are presented in FIG. 4 and it appears that the addition of polyphosphoric acid did not significantly decrease the asphalts resistance to weather.

All references cited in this specification, including without limitation all journal articles, brochures, manuals, periodicals, texts, manuscripts, website publications, and any and all other publications, are hereby incorporated by reference. The discussion of the references herein is intended merely to summarize the assertions made by their authors and no admission is made that any reference constitutes prior art. Applicants reserve the right to challenge the accuracy and pertinence of the cited references.

It is to be understood that the above description is intended to be illustrative and not restrictive. Many embodiments will be apparent to those of skill in the art upon reading the above description. The scope of the invention should therefore be determined not with reference to the above description alone, but should be determined with reference to the claims and the full scope of equivalents to which such claims are entitled.

When introducing elements of the present invention or an embodiment thereof, the articles "a", "an", "the" and "said" are intended to mean that there are one or more of the elements. The terms "comprising", "including" and "having" are intended to be inclusive and mean that there may be additional elements other than the listed elements. Additionally, it is to be understood an embodiment that "consists essentially of" or "consists of" specified constituents may also contain reaction products of said constituents.

The recitation of numerical ranges by endpoints includes all numbers subsumed within that range. For example, a range described as being between 1 and 5 includes 1, 1.6, 2, 2.8, 3, 3.2, 4, 4.75, and 5.

What is claimed is:

1. An asphalt shingle comprising: an organic felt or fiberglass mat; a first layer of a chemically-modified, air-blown asphalt and a second layer of a chemically-modified, air-blown asphalt, wherein the mat is coated on its top surface by one of the layers of chemically-modified, air-blown asphalt and the mat is coated on its bottom surface by the other layer of chemically-modified, air-blown asphalt; and a surfacing material embedded into the surface, that is opposed to the mat, of at least one of the chemically-modified, air-blown asphalt layers;
wherein said chemically-modified, air-blown asphalt is formed by a process for modifying an asphalt that comprises air blowing the asphalt and mixing polyphosphoric acid with the asphalt before the air blowing, during the air blowing, or a combination thereof to form the chemically-modified, air-blown asphalt.

2. The asphalt shingle of claim 1 wherein the polyphosphoric acid is mixed with the asphalt in an amount that is no more than about 2.0 weight percent of the asphalt.

3. The asphalt shingle of claim 1 wherein the polyphosphoric acid is mixed with the asphalt in an amount that is at least about 0.5 weight percent and no more than about 1.5 weight percent of the asphalt.

4. The asphalt shingle of claim 1 further comprising a mineral filler mixed with the chemically-modified, air-blown asphalt.

5. The asphalt shingle of claim 4 wherein the mineral filler is at a concentration that is at least about 50 weight percent and no greater than about 70 weight percent of the chemically-modified, air-blown asphalt.

6. The asphalt shingle of claim 1 further comprising a polymer modifier mixed with the chemically-modified, air-blown asphalt.

7. The asphalt shingle of claim 6 wherein the polymer modifier is selected from the group consisting of styrene-butadiene-styrene copolymers, styrene-butadiene copolymers, styrene block copolymer, styrene-butadiene-rubber, atactic polypropylene, functionalized polyolefins, reactive ethylene terpolymers.

8. The asphalt shingle of claim 6 wherein the polymer modifier is at a concentration of at least about 4 weight percent and no more than about 15 weight percent of the chemically-modified, air-blown asphalt.

9. In a process for manufacturing an asphalt shingle comprising: an organic felt or fiberglass mat; a first layer of a chemically-modified, air-blown asphalt and a second layer of a chemically-modified, air-blown asphalt, wherein the mat is coated on its top surface by one of the layers of chemically-modified, air-blown asphalt and the mat is coated on its bottom surface by the other layer of chemically-modified, air-blown asphalt; and a surfacing material embedded into the surface, that is opposed to the mat, of at least one of the chemically-modified, air-blown asphalt layers;
the improvement comprises using a chemically-modified, air-blown asphalt that is formed by a process for modifying an asphalt that comprises air blowing the asphalt and mixing polyphosphoric acid with the asphalt before the air blowing, during the air blowing, or a combination thereof to form the chemically-modified, air-blown asphalt.

10. The process for manufacturing an asphalt shingle of claim 9 wherein the polyphosphoric acid is mixed with the asphalt in an amount that is no more than about 2.0 weight percent of the asphalt.

11. The process for manufacturing an asphalt shingle roofing of claim 9 wherein the polyphosphoric acid is mixed with the asphalt in an amount that is at least about 0.5 weight percent and no more than about 1.5 weight percent of the asphalt.

12. The process for manufacturing an asphalt shingle of claim 9 wherein the chemically-modified, air-blown asphalt further comprises a mineral filler mixed with the chemically-modified, air-blown asphalt.

13. The process for manufacturing an asphalt shingle of claim 12 wherein the mineral filler is at a concentration that is at least about 50 weight percent and no greater than about 70 weight percent of the chemically-modified, air-blown asphalt.

14. The process for manufacturing an asphalt shingle of claim 9 wherein the chemically-modified, air-blown asphalt further comprises a polymer modifier mixed with the chemically-modified, air-blown asphalt.

15. The process for manufacturing an asphalt shingle of claim 14 wherein the polymer modifier is selected from the group consisting of styrene-butadiene-styrene copolymers, styrene-butadiene copolymers, styrene block copolymer, styrene-butadiene-rubber, atactic polypropylene, functionalized polyolefins, reactive ethylene terpolymers.

16. The process for manufacturing an asphalt shingle of claim 14 wherein the polymer modifier is at a concentration of at least about 4 weight percent and no more than about 15 weight percent of the chemically-modified, air-blown asphalt.

17. The asphalt shingle of claim 1 wherein the polyphosphoric acid is mixed with the asphalt in an amount that is no more than about 1.2 weight percent of the asphalt.

18. The process for manufacturing an asphalt shingle of claim 9 wherein the polyphosphoric acid is mixed with the asphalt in an amount that is no more than about 1.2 weight percent of the asphalt.

19. A method of increasing the tear strength of an asphalt shingle that comprises: an organic felt or fiberglass mat; a first layer of a chemically-modified, air-blown asphalt and a second layer of a chemically-modified, air-blown asphalt, wherein the mat is coated on its top surface by one of the layers of chemically-modified, air-blown asphalt and the mat is coated on its bottom surface by the other layer of chemically-modified, air-blown asphalt; and a surfacing material embedded into the surface, that is opposed to the mat, of at least one of the chemically-modified, air-blown asphalt layers;
the method comprising manufacturing the asphalt shingle so that the asphalt of said asphalt shingle is a chemically-modified, air-blown asphalt that is formed by a process for modifying an asphalt that comprises air blowing the asphalt and mixing polyphosphoric acid with the asphalt before the air blowing, during the air blowing, or a combination thereof to form the chemically-modified, air-blown asphalt, wherein the increase in the tear strength is determined by comparing the tear strength of said asphalt shingle to a standard asphalt shingle that is identical to said asphalt shingle except for the fact that a corresponding portion of the asphalt of said standard asphalt shingle is an otherwise identical air-blown asphalt that was not mixed with polyphosphoric acid before or during the air blowing or a combination thereof.

* * * * *

UNITED STATES PATENT AND TRADEMARK OFFICE
CERTIFICATE OF CORRECTION

PATENT NO. : 7,678,467 B2  Page 1 of 1
APPLICATION NO. : 11/562819
DATED : March 16, 2010
INVENTOR(S) : Falkiewicz et al.

It is certified that error appears in the above-identified patent and that said Letters Patent is hereby corrected as shown below:

Column 20 line 17-18 delete the word "roofing" from claim 11

Signed and Sealed this

Eighteenth Day of May, 2010

David J. Kappos
*Director of the United States Patent and Trademark Office*